Sept. 1, 1970    D. W. SEREGELY    3,526,522
INK FOLLOWER COMPOSITION AND METHOD THEREFOR
Filed Oct. 18, 1967
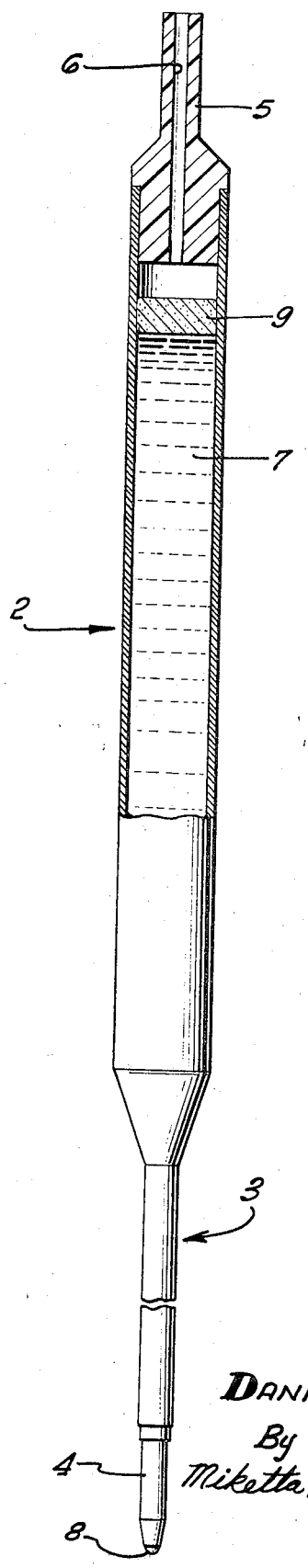
INVENTOR.
DANIEL W. SEREGELY
By
Miketta, Glenny, Poms & Smith
ATTORNEYS.

United States Patent Office 3,526,522
Patented Sept. 1, 1970

3,526,522
INK FOLLOWER COMPOSITION
AND METHOD THEREFOR
Daniel W. Seregely, Los Angeles, Calif., assignor, by mesne assignments, to The Gillette Company, Boston, Mass., a corporation of Delaware
Filed Oct. 18, 1967, Ser. No. 676,244
Int. Cl. C08h 9/00, 17/22, 17/28
U.S. Cl. 106—270                                4 Claims

ABSTRACT OF THE DISCLOSURE

Viscous compositions adopted for use as followers in contact with various types of ink in ballpoint pen ink reservoirs, said compositions being stable for a prolonged time under a wide range of temperatures and humidity, non-drying, non-reactive and immiscible with various inks and effective to prevent backleakage of ink from a cartridge, said compositions comprising essentially a liquid vehicle containing a uniformly suspended dispersion of a solid polymer in the form of microscopic, almost colloidal, particles, the amount of solid polymer being sufficient to give the viscous composition an A.S.T.M. worked penetration of 250 to 500 at 77° F.

Methods of making such viscous composition, the methods including the step of melting solid organic polymers in a liquid vehicle and rapidly chilling the molten mixture to form a dispersion of solid organic polymers in finely divided form in situ and controllably producing a composition of desired characteristics.

A large diameter ball point pen ink reservoir having a large diameter elongated tubular casing, one end of said tubular casing being open to the atmosphere, a column of viscous ink contained in said reservoir, and a plug of the above described ink follower composition in said reservoir and in contact with the end of said column of viscous ink nearest the atmosphere.

BACKGROUND OF THE INVENTION

As a general rule, most pens having a rotatably mounted ball for the writing means have an ink reservoir, the rear end of which is opened to the atmosphere and the forward end of which is in communication with or attached to the writing means. The ink reservoir is filled with a suitable ink and the rear end of the body of ink in the cartridge is in communication with the atmosphere.

In small diameter reservoirs (diameters of approximately 0.1 inch) viscous inks are usually employed, their viscosity being sufficient to prevent backleakage when the writing instrument is held in an inverted position. A longer writing life is attained when reservoirs of larger diameter are employed, but the ink contained in the reservoir has a greater tendency to ooze out of the open pen (referred to as "backleakage") when the pen is inverted. In either case, the surface of the body of ink is often oxidized, volatiles may evaporate therefrom and change its consistency, drying and writing ability, and the viscosity may vary with ambient temperature and humidity. Moreover it is not possible to employ many highly desirable ink compositions because they contain volatiles or lack the necessary viscosity or shear strength to permit their use in an open ended reservoir.

In order to prevent backleakage of the ink and also to prevent the ink from being contacted by the atmosphere, various types of plugs have been placed in the reservoir in an attempt to effectively seal the ink and, at the same time, follow the ink down the reservoir as it is used during writing. Solid plugs and grease have been proposed for this purpose.

Solid plugs have usually been in the form of a metal or felt cover or piston; however, these solid plugs have not been very successful in that they are expensive to manufacture, difficult to install, tend to wedge and fail to follow the ink or sometimes sink into the body of ink and, therefore, the ink has a tendency to leak out in spite of the placement of the piston in the reservoir.

In view of the foregoing disadvantages with a solid piston, it has been suggested in the prior art to utilize a non-solid plug. The so-called non-solid plugs are generally composed of grease. Many greases are not stable under wide ranges of temperature and humidity, are not immiscible with modern types of ball point inks and lose their effectiveness when co-mingled with the ink; also, they tend to adhere to the inside wall of an ink reservoir, requiring the initial use of a thick body of grease, which reduces the ink capacity of the reservoir.

SUMMARY OF THE INVENTION

The present invention is based upon the surprising discovery that ink follower compositions for ball point pens can be produced in which the ink follower composition does not intermingle with the ink, prevents backleaking of the ink, follows the ink down the sides of the ink reservoir without depletion due to adherence to the wall, prevents the ink from being contacted or contaminated by the atmosphere and is stable under a wide range of temperature and humidity conditions.

The exceptional and surprising characteristics of the composition of this invention are obtained by controlling the quantity and the size of solid polymer particles formed and dispersed in a liquid vehicle, whereby the resulting mass has a remarkable stability under a wide range of ambient conditions, a worked penetration value within a range stated hereinafter, and by controlling the formation of the solid polymer particles in situ by a rapid but controlled chilling of a melt of solid polymer or polymers in the liquid vehicle.

It is thus an object of the present invention to embody an ink follower composition for use in an ink reservoir which will not mingle with the ink contained in the reservoir.

Another object of the invention is to disclose and provide an ink follower composition which effectively protects the ink contained in an ink reservoir against deterioration from the atmosphere.

It is a further object of the present invention to disclose and embody an ink follower composition which prevents backleaking of the ink.

It is still a further object of the invention to provide a liquid containing a solid dispersion of plastic which is not grainy, which will not separate over a long period of time and which is stable under a wide range of temperature and humidity conditions.

Still another object is to provide an ink follower composition which follows the ink column by maintaining contact with the surface as the ink travels toward the tip due to reduction of ink supply during writing.

Still another and further object is to provide a novel method for producing the said compositions, said method allowing for the production of a follower composition containing solid plastic which is not grainy and will not separate from the liquid itself over a period of time.

BRIEF DESCRIPTION OF THE DRAWING

The drawing is a representation of an ink cartridge including one form of an ink reservoir (portions of the body being broken away) wherein the relationship of the ink follower composition to the cartridge can be readily understood.

DESCRIPTION OF THE PREFERRED EMBODIMENTS

The drawing somewhat diagrammatically represents a complete cartridge of the ball point type including an upper reservoir section 2 of relatively large diameter (i.e. the diameter is larger than the maximum value at which the reservoir acts as a capillary), an auxiliary reservoir 3 into which tip 4 extends. The auxiliary reservoir 3 has a smaller internal diameter than the upper reservoir. The rear end of the upper reservoir can be provided with a plug having a rearwardly extending projection 5 which has an axial bore 6 to permit air to enter the rear part of the cartridge. A column of ink 7 is contained in the reservoir, such body of ink being continuous in that it fills the upper reservoir section 2 and the auxiliary tubular reservoir 3, thereby insuring a continuous, unbroken supply of ink to the writing ball 8. Superimposed upon the upper surface of the body of ink in the reservoir there is an ink follower composition indicated generally at 9.

During writing, the body of ink within the reservoir is depleted and the ink follower composition 9, being in contact with the top surface of the ink as well as with the walls of the reservoir, follows the ink as its level drops. The body of the ink follower composition maintains its coherence and integrity and is insoluble and immiscible with the ink; it is also of a non-drying character. Inasmuch as the ink follower composition follows the ink, the amount of ink follower composition need only be sufficient to completely cover the surface of the ink column. This small amount of follower composition will protect the ink from the action of atmospheric air and thereby prevent the ink from being oxidized or from entrapping bubbles of air so that subsequent utilization of the pen is satisfactory. In addition, the small amount of ink follower composition prevents the ink from oozing out of the open end which the ink has a tendency to do when held in an inverted position for any substantial period of time.

Ink follower composition 9 is composed basically of two components, a liquid vehicle (constituting 50% to 98% and preferably from about 70% to about 90% by weight of the composition) having dispersed or suspended therein solid, microscopic grains or particles (almost colloidal in size) of organic plastic or polymer (constituting 2 to 50% or preferably from about 10% to 25% by weight), the resulting product being a non-grainy, homogeneous and stable mass having the desired characteristics hereinabove noted.

The liquid vehicle may be any stable, virtually non-volatile, non-drying, non-oxidizable material which is liquid at temperatures at which pens are normally utilized. The liquid vehicle must be compatible with the solid resin or plastic when the solid resin or plastic is melted in order that a homogeneous admixture can easily be obtained. In addition, the liquid vehicle must have a boiling point above the melting point of the solid plastic utilized and should not react with the solid plastic. Moreover, the liquid vehicle should not dissolve the solid plastic at temperatures at which a pen is normally utilized. Preferably, the liquid vehicle is an oily type substance, e.g. a hydrocarbon oil such as a mineral oil. Liquid polymers may also be utilized as the liquid vehicle. Examples of such liquid polymers would be polybutene having a relatively low molecular weight, a low molecular weight polyethylene and a low molecular weight polypropylene. The reason for the limitation on the molecular weight is due to the fact that, in general, polymers having a high molecular weight are solid at room temperatures which would make them undesirable in the present invention. The liquid vehicle of the present invention must have a solidification point less than ambient temperature or those temperatures which a pen is normally utilized.

The particular viscosity of the liquid vehicle is not critical inasmuch as the consistency of the final product can be varied by varying the amount of the solid plastic in the liquid vehicle. If the liquid vehicle has a relatively low viscosity, then the amount of solid polymer added to the liquid vehicle will be greater than the amount added to a liquid vehicle having a relatively high viscosity. As has already been noted, liquid vehicles preferably utilized in this invention are those which can be classified as oily liquids. By an oily liquid is meant a liquid of relatively high viscosity and having a "slippery" feel. Included within this definition are liquid plastics, as enumerated above, and other viscous liquids such as polyethylene glycol, polypropylene glycol and octylene glycol. If desired, a mixture of liquids can form the liquid vehicle.

The solid portion of the ink follower composition of this invention can be any plastic which is solid at temperatures of use or storage of a ball point pen. Generally speaking, these temperatures would range between about 5° C. to as high as 100° C.; however, as a practical matter, the temperatures would probably be between 10° C. an 70 or 80° C. Therefore, the solid plastics usable in this invention should have a melting point of at least 70° C. but preferably above 100° C. In addition, the solid plastics usable in this invention must melt at a temperature below the boiling point of the liquid vehicle. The solid plastics when melted should be miscible in the liquid vehicle, at least to the extent that there can be formed a homogeneous mixture, and the solid plastics should not react with the liquid vehicle. Examples of such solid plastics are nylon, ethylene vinyl acetate, polyethylene, polypropylene, polybutylene, etc.

The ink follower compositions of this invention are made by mixing a liquid, e.g., a mineral oil, with solid plastic, and then heating the thus formed mixture, while stirring, to a temperature at which the solid plastic melts. Stirring is continued until the melted plastic is uniformly dispersed throughout the liquid. If desired, the mixture or solution can be heated to higher than the melting point of the solid plastic, but it is usually neither necessary nor desirable. After the solid has melted, the entire mixture is rapidly cooled to at least below the melting point of the solid plastic whereby there is formed a uniform dispersion of finely divided particles of solid plastic (almost colloidal in size) in the liquid. If the mixture is not rapidly cooled or is not uniformly cooled throughout, then grainy particles of the solid plastics are found. This formation of grainy particles is very undesirable because, inter alia, the resulting composition will separate into phases upon standing. In addition, the work penetration value is too high, i.e., the work penetration value is greater than 500.

The rapid cooling called for above is preferably accomplished by pouring the heated mixture on a flat, inert surface such as a stone bench top, metal plate or any other suitable heat exchanger surface. In order to insure that the hot mixture is uniformly cooled, the mixture is flowed on the smooth cooling surface so as to rapidly form a thin film having a thickness of less than ¼", and preferably about 0.04" to 0.07". The film or layer should be formed rapidly, without undue working or stretching of a partially chilled film. It has been found desirable to employ a cooling surface which is at a temperature of about 20° C. or more below the melting point of the solid polymer dissolved in the liquid vehicle; for most of the mixtures, a surface at a temperature of between 70° C. and 20° C. appears satisfactory. With a film of the preferred thickness and a chilling surface at 20°–25° C., the liquid melt is converted into a stable mass of desired consistency and containing the solid polymer in the form of microscopic, almost colloidal particles, in a matter of less than two minutes, preferably from twenty to sixty seconds. If the starting liquid is colorless, the resulting ink follower composition mass is translucent, which indicates that the particle size of the solid plastic or polymer is of the right size. When this occurs, the mass is designated as being non-grainy. On the other hand, if the resulting ink follower composition mass is opalescent, this indicates that the particle size of the solid plastics or polymer is too great and that the chilling step was not conducted as set forth above. An opalescent mass indicates the presence of grainy particles of solid plastics. This formation of grainy particles is undesirable because, inter alia, the ink follower composition is unstable and will separate into phases upon standing and also the consistency of the ink follower composition will not be sufficient to allow the mass to follow the ink down the reservoir as an integral unit.

When temperatures of 0° C. or lower are used in chilling the hot mixture, the thin films appear to chill too rapidly and the product becomes rubbery and elastic and may exhibit Durometer readings of 20 through as high as 40. Working or stretching of a partially chilled film also increases rubberiness of the product. Although these rubbery products have interesting properties, the primary object of this invention is to obtain the mass previously described which may have a viscosity of 100,000 to about 250,000 centipoises.

As already noted above, the chilling process can be carried out on various types of equipment such as stationary, planar chilling surfaces (batch operations), or for continuous productions on movable, flexible metallic bands or conveyors which may travel from a free-cooling zone to a coating zone, including a doctor blade or spray and then to a scraping or discharge zone, or by using an internally chilled, hollow, rotating and smooth surface cylinder, the liquid melt being applied at one zone and the product scraped off at another. The temperatures, speeds of travel, etc., may vary with the melt temperatures, proportion of solid polymer or plastic, and consistency desired, but are readily determined by following the teachings herein given.

A presently preferred embodiment of the ink follower composition is given infra, all parts being by weight unless otherwise indicated.

Preparation of ink follower composition I

The following components are used to prepare this ink follower composition:

| Components: | Pts. by wt. |
| --- | --- |
| (1) Mineral oil (200 to 300 centipoises) | 61 |
| (2) Liquid polybutene (molecular weight 900) | 25 |
| (3) Amorphous polypropylene (Eastobond M-5, molecular weight of about 10,000 to 15,000) | 7 |
| (4) Low molecular polyethylene (Epolene C-15, molecular weight of 4,000) | 3 |
| (5) Crystalline polypropylene (Eastman LVPX3259-42, molecular weight about 5,000 to 10,000) | 4 |

The components listed above are stirred and heated (to about 170° C. or higher) in a container until the solid resins (items (3), (4) and (5) above) go into solution. The hot solution is then poured onto a cool (20° to 30° C.) stone bench top, metal plate or other suitable heat exchanger as a layer having a thickness of 0.07″ or less.

The above produced ink follower composition is a translucent mass which indicates that the particle size of a solid plastic is microscopic or almost colloidal in nature. The ink follower composition produced as above prevents backleaking of inks containing highly polar solvents such as propylene glycol or more oleophillic solvents such as benzyl alcohol.

The ink follower composition has an A.S.T.M. worked penetration of 325-380 at 77° F. In order to have an ink follower composition which will prevent backleaking and will maintain its coherence and integrity when following the ink down the reservoir, the ink follower composition must have an A.S.T.M. worked penetration of 250-500 (preferably 250-400) at 77° F.

The worked penetration is measured by standard A.S.T.M. tests. By the term "worked," is meant that the composition is tested for penetration after it has been mixed or stirred. The work sample is brought to a temperature of 77°±1° F. before the test. If the sample is initially within 3 to 4 degrees F. of this temperature, it is brought to 77° F. by placing in a water bath for 30 to 40 minutes; but if the initial temperature is outside this range, the composition is placed in a constant-temperature bath for one and one-half hours to obtain the desired constant temperature of 77° F. The placement of the sample in a constant-temperature bath is necessary in order to insure that the sample will have the same temperature at the surface as it does in the main body of the ink follower composition.

The sample is placed on a penetrometer table and the cone lowered until the tip just touches the top surface of the sample. The cone is constructed of stainless steel or brass and has a detachable hardened-steel or stainless-steel tip. The cone and the tip have standard dimensions which are well-known in the art and therefore will not be enumerated herein. For example, reference is made to Asphalts and Allied Substances, Fifth Edition, Volume 2, page 993 to 1000, D. Van Nostrand Company, 1945.

After placing the sample on the penetrometer table the cone is lowered until the tip just touches the top surface of the sample. Finally the plunger is quickly released and held free for five seconds. The total penetration of the tip and cone is read from a scale and this is reported as the worked penetration or consistency.

In the foregoing example, the liquid portion of ink follower composition is composed of mineral oil and liquid polybutene. Mineral oil is any liquid product of petroleum within the viscosity range of products known as oils. Mineral oils are well-known in the art and therefore a further definition thereof would be superfluous; however, it should be emphasized that any mineral oil can be utilized in the present invention if it is non-drying and has a solidification point less than ambient temperature. That is, the mineral oils of this invention will not dry when exposed to atmospheric conditions and are in a liquid state in the temperature range at which pens are normally utilized.

Also, any liquid polybutene can be utilized in the present invention. This includes polymers of isobutene and, in addition, polymers of butene-1 and butene-2.

In the foregoing example, the solid plastics of the ink follower composition were composed of three separate plastics: polyethylene, amorphous polypropylene, and crystalline polypropylene.

Any polyethylene can be used in the present invention. However, it is generally preferred to use low molecular weight polyethylene because it is generally desirable that the solid plastic not have too high a melting point. For example the low molecular weight polyethylene will have a molecular weight of less than 7,000, e.g. between 500 and 7,000. However, high molecular weight polyethylenes can be used, e.g. as high as 15,000.

Among the preferred polyethylene polymers used in this invention are those sold under the tradename "Epolene." The Epolenes are a series of low molecular weight polyethylene resins which have a softening point generally between 100° C. and 114° C. The Epolenes also have a viscosity of about 340 centipoises to 16,000 centipoises at 120° C.

The term amorphous polypropylene as used in the specification and claims, includes polypropylene polymers which are essentially non-crystalline. Generally, these polypropylene polymers are primarily of the atactic type which has the physical form of a hard, high-melting wax. Preferably, the amorphous polypropylene has a molecular weight in the range of about 3,000 to 25,000.

In addition to the amorphous polypropylene described above, the ink follower compositions of this invention preferably also contain, in the solid dipersion, a crystalline polypropylene which can be either of the isotactic form (the polymer is isotactic to the extent of at least 60%) or the syndiotactic form. The preferred form is the isotactic because it has a lower melting point (between 168° and 171° C.) than does the syndiotactic form. This crystalline polypropylene can have a molecular weight of 40,000 or more (which would be about 1,000 monomer units of propylene) but preferably the molecular weight is lower, e.g. from 2,000 to 15,000.

Preparation of ink follower composition II

The following components were used in producing this ink follower composition:

Components: Pts. by wt.
(1) Mineral oil (200 to 300 centipoises) _____ 58
(2) Liquid polybutene #24 (molecular weight 900) _____ 26
(3) Amorphous polypropylene (Oletac 100, molecular weight between 10,000–15,000) __ 8
(4) Low molecular weight polyethylene (Epolene C12, molecular weight 3,000) _____ 4
(5) Crystalline polypropylene (Eastman LVPX3259–42, molecular weight 5,000 to 10,000) _____ 4

The ink follower composition produced in accordance with this embodiment has a non-worked penetration value of 288 and a worked penetration value of 308. It has little or no oil bleed.

Performance of follower compositions II and III with specific inks

Ink follower compositions of this invention have been tested with certain inks and compared with normal follower compositions presently being utilized by number of manufacturers. The inks which were utilized in these tests are identified as ink 307 and ink 312. Ink 307 is composed of a colorant and propylene glycol which is a hydrophilic solvent. The ink composition has a viscosity of 16,000 centipoises, a pH of about 9.5, and a surface tension of between 32 and 34 dynes/cm.

In composition No. 312 contains inter alia a colorant, oleic acid and a hydrophobic solvent system. This ink composition has a specific gravity of 1.0917, a viscosity of about 16,000 centipoises, a pH of 6.3, and a surface tension of between 32 to 34 dynes/cm.

TABLE OF PROPERTIES

| Ink | Follower | Backleakage | | Ink sweepdown | Dye diffusion | Oil bleed |
|---|---|---|---|---|---|---|
| | | Backleak cycling test | 140° F. storage | | | |
| 307 | II | 100 cycles, no backleakage | No leakage | Fair to good | Slight at 140° F | Negligible. |
| | III | do | Not tested | do | do | Do. |
| | Plastilube 0 | do | 17 of 25 refills leaked after 54 days. | Good | 100% at 140° F | Measurable to excessive. |
| 312 | II | do | 1 of 25 refills leaked after 54 days. | do | Slight at 140° F | Negligible. |
| | III | do | Not tested | do | do | Do. |
| | Plastilube 0 | Gel formation, incompatible. | Grease/ink interaction, incompatible. | Poor | 100% at 140° F | Measurable to excessive. |

The components are mixed together in any sequence desired and then are heated until the solid resins (items (3), (4) and (5) above) are dissolved and go into solution. This hot solution is then poured onto a stone bench top which is at ambient temperature (about 25° C.), the layer of the hot solution not exceeding 0.04″. The solution is then allowed to cool until it reached 100° C. or less, preferably until it reaches room temperature. The ink follower composition is then ready to be placed in a ball point pen ink reservoir.

The above prepared ink follower composition has an unworked penetration value of 346 and a worked penetration value of 372. These penetration values were determined in the manner set forth above in the specification. The ink follower composition did not oil bleed.

Preparation of ink follower composition III

The following constituents were used in preparing the ink follower composition of this embodiment:

Components: Pts. by wt.
(1) Mineral oil (200 to 300 centipoises) _____ 58
(2) Liquid polybutene (molecular weight 900) _ 26
(3) Amorphous polypropylene (Paisley Polymer #63–7501–0, molecular weight 15,000) ____ 9
(4) Low molecular weight polyethylene (Epolene C15, molecular weight 4,000) _____ 3
(5) Crystalline polypropylene (Eastman LVPX3259–42, molecular weight 5,000 to 10,000) _____ 4

The components above are stirred and heated until the solid plastics (items (3), (4) and (5) above) are melted, about 170° C. The hot solution is then poured onto a thick metal plate which has a temperature of about 20° C. The thickness of the hot solution on the plate is about 0.04″. The layer of hot solution cools to at least 40° C. within one minute. Upon cooling, the ink follower composition is ready for use in a ball point pen ink reservoir.

Ink compositions I through III, described above, all exemplify embodiments wherein five components were utilized. The following embodiments exemplify ink compositions of this invention which contain two or three components.

Preparation of ink follower composition IV

The following components are used to prepare this ink composition:

Components: Pts. by wt.
(1) Mineral oil (200 to 300 centipoises) ____ 53
(2) Liquid polybutene (molecular weight 900) _____ 35
(3) Polyethylene (Epolene C10, molecular weight 7,000) _____ 12

The components above are stirred and heated until the solid plastic (item (3)) is dissolved and goes into solution. The hot solution is then poured onto a thick metal plate which has a temperature of from 20° to 25° C. The thickness of the hot solution on the plate is about 0.04″ and the layer cools to at least 40° C. within one minute. Upon cooling, the ink follower composition is ready for use in a ball point pen ink reservoir.

The ink follower composition produced in accordance with this embodiment has a non-work penetration value of 320 and a worked penetration value of 375. It has little or no oil bleed.

Preparation of ink follower composition V

The following components were used in producing this ink follower composition:

Components: Pts. by wt.
(1) Liquid polybutene (molecular weight 900) _____ 97
(2) Crystalline polypropylene (Eastman LVPX3259–42, molecular weight 5,000 to 10,000) _____ 3

The two ingredients above were mixed and the mixture heated until the polypropylene dissolved. The hot solution is then poured onto a stone bench having a temperature of about 25° C. The thickness of the hot solution on the plate is .04" thick and the solution cools to at least 40° C. within a minute. The ink follower composition is then ready for use in a ball point pen ink reservoir by merely scraping the composition from the stone bench plate.

The ink composition has a non-worked penetration value of about 400 and does not oil bleed.

Preparation of ink follower composition VI

The following components were utilized in preparing this ink follower composition:

Components: Pts. by wt.
(1) Liquid polybutene _____ 96
(2) Polyethylene (molecular weight 10,000) __ 2
(3) Crystalline polypropylene (Eastman LVPX3259-42, molecular weight 5,000 to 10,000) _____ 2

The components are stirred and heated until the solid plastics (items (2) and (3) above) dissolve and go into solution. The hot solution is then poured onto a thick metal plate which has a temperature of about 20° C. The thickness of the hot solution on the plate is about 0.04" and the hot solution cools to around 40° C. within one minute.

The ink follower composition produced above has a non-worked penetration value of 350 and a work penetration value of 500.

It will be understood that the foregoing description is only illustrative of the present invention and it is not intended that the invention be limited thereto. Many other specific embodiments of the present invention will be apparent to one skilled in the art from the foregoing disclosure. Other substitutions, alternations, and modifications of the present invention which come within the scope of the following claims or to which the present invention is readily susceptible without departing from the spirit and scope of this disclosure are considered a part of the present invention.

I claim:
1. In a method of producing a viscous ink follower mass consisting essentially of a stable suspension of particles of a solid plastic selected from the group consisting of nylon, ethylene vinyl acetate, polyethylene, polypropylene, polybutylene, and mixtures thereof, in a liquid vehicle, including the step of melting said solid plastic in a non-drying and non-reactive liquid vehicle with stirring to form a homogeneous mixture of said melted plastic and said liquid vehicle, the improvement wherein said homogeneous mixture is rapidly and uniformly cooled to a temperature less than 70° C. and above 0° C. in less than two minutes to produce in the liquid vehicle a stable suspension of solid plastic particles of microscopic size and in finely divided form so that the resulting composition is translucent.

2. A method according to claim 1 wherein the viscous mass has an A.S.T.M. worked penetration of 250–500 at 77° F.

3. A method according to claim 1 wherein the liquid vehicle is a member selected from the group consisting of liquid mineral oil, liquid polymer, and mixtures thereof.

4. A method according to claim 3 wherein the heated mixture is substantially uniformly cooled to a temperature of less than 70° C. in less than 2 minutes by pouring the heated mixture on an inert surface to form a film having a thickness less than .07 of an inch.

References Cited

UNITED STATES PATENTS 2,627,938  2/1953  Frohmader et al.
2,615,857  10/1952 Clarke.
3,084,089  4/1963  Morgan et al.

FOREIGN PATENTS 798,897  9/1956  Great Britain.

DONALD J. ARNOLD, Primary Examiner

J. B. EVANS, Assistant Examiner

U.S. Cl. X.R.

106—271, 272, 285; 260—28.5, 33.6, 34.2; 401—142